March 26, 1929.  R. W. DINZL  1,707,212
ELEVATING MECHANISM
Filed Feb. 23, 1928
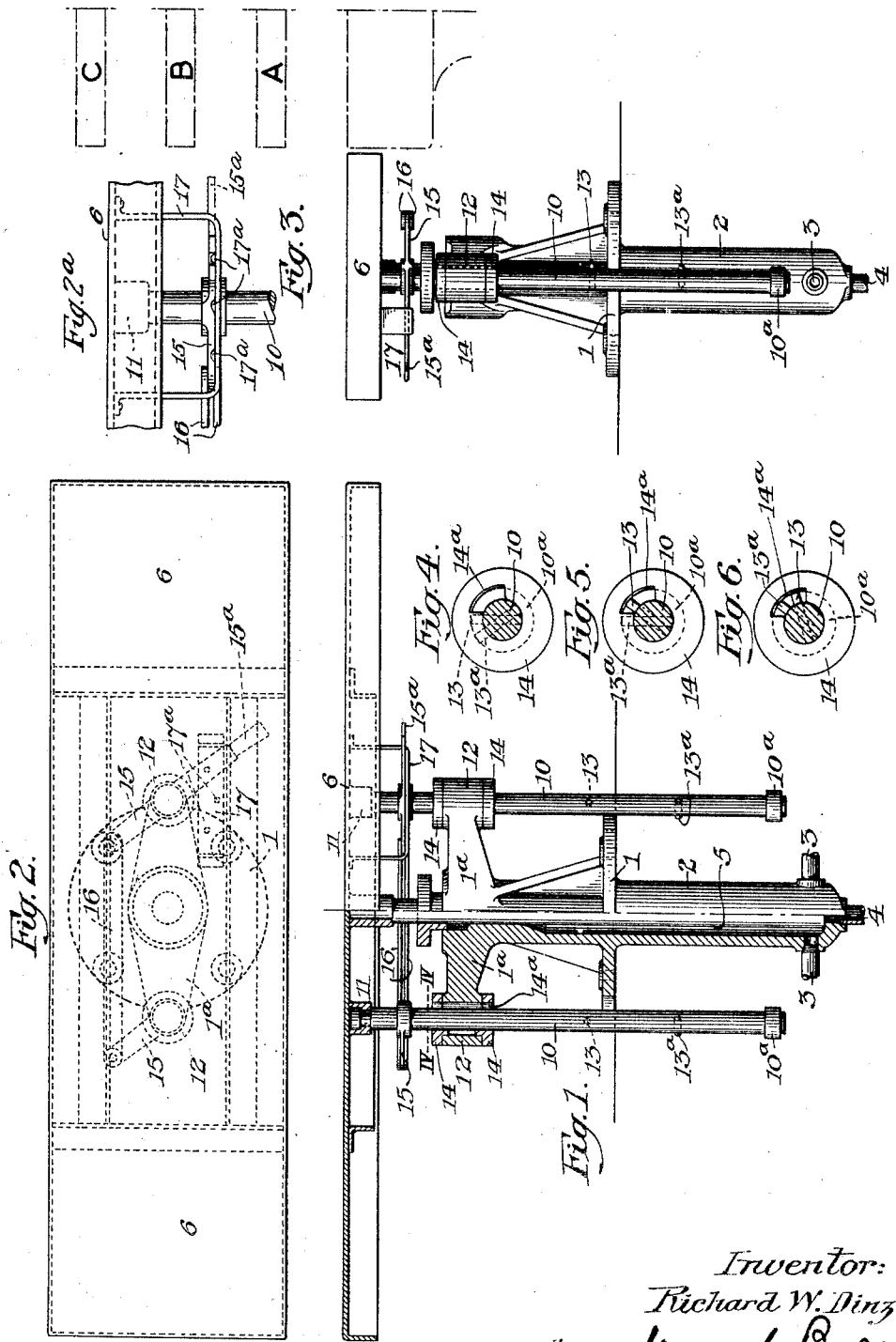
Inventor:
Richard W. Dinzl,
by Murray C. Boyer
Atty.

Patented Mar. 26, 1929.

1,707,212

UNITED STATES PATENT OFFICE.

RICHARD W. DINZL, OF MARGATE CITY, NEW JERSEY, ASSIGNOR TO SOUTHWARK FOUNDRY & MACHINE COMPANY, OF PHILADELPHIA, PENNSYLVANIA, A CORPORATION OF PENNSYLVANIA.

ELEVATING MECHANISM.

Application filed February 23, 1928. Serial No. 256,238.

My invention relates to lifting or elevating devices and the main object of my invention is to provide means for lifting onto and removing from their position with respect to the platens, the molds employed in steam platen presses. These molds are quite heavy and it is highly desirable that the elevating mechanism be halted with its upper surface in registry with the surfaces of the respective platens upon which the molds are to be placed or from which they are removed.

A further object of my invention is to provide means for halting the platform of the elevating mechanism in exact registry successively with the surfaces of the several platens of the press.

In order that the elevating mechanism which I have devised may be arrested at various heights with reference to the platens of the steam platen press, I provide rotatable rods depending from the platform of the elevator, which rods pass through housings carried by the supporting frame of the elevating structure, and provide said rotatable rods with members adapted to engage successively the under portion of said housing; the latter being slotted to permit passage of certain of such stopping members when the rotatable rods have been partially turned. My invention includes means for effecting movement of such rotatable members.

These and other features of my invention are more fully described hereinafter; reference being had to the accompanying drawings, in which:

Figure 1 is a view in elevation, partly in section, of elevating mechanism within the scope of my invention.

Fig. 2 is a plan view of the same.

Fig. 2$^a$ is an enlarged view, partly in section, of a portion of the structure shown in Fig. 2.

Fig. 3 is a side elevation, and

Figs. 4, 5 and 6, are plan views, partly in section on the line IV—IV, Fig. 1.

In the drawings, 1 represents a suitable frame or supporting structure which may include a cylinder 2, receiving pressure from a suitable source delivered to and exhausted from the same via suitable inlet and outlet passages, which may be those indicated at 3 and 4. Disposed within the cylinder is a ram or plunger 5, and connected to the upper end of such ram or plunger is a platform 6, which platform is raised and lowered by movement of the plunger 5 within the cylinder 2.

Depending from said platform are a plurality of rods 10, in the present instance two, rotatably mounted in sockets 11 carried on the underside of the platform 6, and passing through housings 12 at the ends of arms 1$^a$ of the frame 1; such rods being provided with projecting members or lugs 13 and 13$^a$, set radially with respect to said rods and occupying different angular and vertical positions with respect to each other.

The housings 12 at the ends of the arms 1$^a$ may be provided with enlarged openings for the passage of the rods 10, and have upper and lower cap members 14 fitting said rods, which cap members are slotted as indicated at 14$^a$, more particularly illustrated in Figs. 4, 5 and 6, for the passage of the lugs 13 and 13$^a$ during the intermittent upward movements of the platform and the lowering of the same. In addition to their function of carrying the lugs 13 and 13$^a$, the rods 10 serve as guiding means during the vertical movements of the platform 6.

The upper ends of the rods 10 are provided with arms 15, connected by toggle links 16, so that simultaneous motion can be imparted to the same; one of the arms 15 being extended in the form of an operating handle 15$^a$. This handle is movable with respect to a support 17, hung from the platform 6, which support may be provided with small bosses 17$^a$, clearly shown in Fig. 2$^a$, so that the successive movements of the handle may be arrested by said bosses entering registering recesses in the handle; such positions of the handle providing for the proper relative position of the rotatable rods so that the respective lugs 13 and 13$^a$ of the same may be placed in proper position for engagement with the upper side of the housings 12, or to pass through the same and the slots 14$^a$ of the cap members 14, when fluid is admitted to the cylinder 2 to cause the plunger 5 to raise the platform 6.

When it is desired to lift the platform, pressure is admitted to the cylinder 2. After the platform has been raised to one position where it registers with the lower steam platen "A" of the press, for instance; having been halted by the lugs 13, the handle 15ᵃ may be moved to the left until its recess registers with the middle boss 17ᵃ. In this position the upper lugs 13 may pass through the slots 14ᵃ as indicated in Fig. 5, and the rods 10 rise with the platform until the next set of lugs, indicated at 13ᵃ, engage the under side of the housings, and this action will take place for each movement of the handle until the limit of elevation has been reached. In the present instance provision is made for three elevating steps and the platform is arrested at its extreme height by the collars 10ᵃ of the rods 10. The platform will be lowered upon exhausting the fluid pressure from the cylinder 2, and during such movement the handle 15ᵃ will be at the extreme position at the left of the support 17 and the lugs 13 and 13ᵃ will be in the position indicated in Fig. 6; free to pass through the slots 14ᵃ of cap members 14.

In practice it is usual to withdraw one mold from the press and introduce a fresh one, and the platform is made large enough to accommodate both molds during such transfer. When the elevator is raised to a position to permit placement of a fresh mold, a cured mold will be first withdrawn at the same level and this may go on until the press is emptied of the cured molds and filled with fresh molds.

While I have illustrated toggle mechanism, under the control of the handle 15ᵃ, for rotating the rods 10, it will be understood that any equivalent mechanism that will effect simultaneous movement of these rods, gearing, for instance, is within the scope of my invention. For convenience, the rods are arranged to move in the same direction hence, in the present instance, their lugs are set in each rod in the same relation and the slotted portions of the housings are in the same relative position—to the right, looking at Fig. 1. It will be understood, of course, that these rods may turn in opposite directions and have their lugs so disposed relatively to the slots of the housings, together with such disposition of the slots of the housings, that the desired registry between the lugs or other projections and the stopping portions of the housing and the slotted portions thereof may be effected and that the respective parts will function regardless of the manner or the direction in which the rods may be turned so long as the cooperating parts occupy the required relative position.

While I have illustrated in the accompanying drawings provision for three upward movements of the elevator, it will be understood that such disclosure is for illustrative purpose only and that my improved mechanism may be employed with elevator platforms having a greater or less range of movement; the necessary parts being increased or decreased and otherwise modified as may be necessary to effect this result.

I claim:

1. The combination, in elevating mechanism, of a platform, means for lifting the same, a rotatable rod depending from said platform, stopping means operatively disposed with respect to said rod, projections carried by said rod, and means for moving said rod to bring a projection into position to be arrested by said stopping means as the platform lifts.

2. The combination, in elevating mechanism, of a platform, fluid pressure means for lifting the same, a plurality of rotatable rods depending from said platform, guiding means for said rods, lugs carried by said rods, and means for moving said rods to bring lugs into position to be arrested by stopping means associated with said guiding means as the platform lifts.

3. The combination, in elevating mechanism, of a frame, a platform vertically movable with respect to the same, fluid pressure means for lifting the same, a rotatable rod depending from said platform, a housing forming stopping means through which said rod passes, a plurality of projecting lugs carried by said rod and occupying different angular and vertical positions with respect to each other, and means for bringing a lug of said rod into position to be arrested by the housing as the platform lifts; said housing being slotted for the passage of a lug when another lug has been disposed in stopping position.

4. The combination, in elevating mechanism, of a frame, a platform vertically movable with respect to the same, fluid pressure means for lifting the same, a plurality of rotatable rods depending from said platform, slotted housings forming guiding and stopping means through which said rods pass, a series of projecting lugs carried by said rods and occupying different angular and vertical positions with respect to each other, and means for bringing a lug of each rod into position to be arrested by said housings as the platform lifts; one lug being free to pass through said slot when another lug has been disposed in stopping position.

5. The combination, in elevating mechanism, of a support including a cylinder, a plunger in said cylinder, a platform supported by said plunger, means for introducing and exhausting motive fluid to and from said cylinder, a rotatable rod depending from said platform, a slotted housing and guide carried by the support through which said rod is vertically movable, a plurailty of lugs carried by said rod in different angular positions and adapted to engage the housing to arrest upward movement of the platform, and means for rotating said rod to bring a stopping lug into position and permit another stop to pass through the slotted housing.

6. The combination, in elevating mechanism, of a support including a cylinder, a plunger in said cylinder, a platform supported by said plunger, means for introducing and exhausting motive fluid to and from said cylinder, a plurality of rotatable rods depending from said platform, slotted guide housings carried by the support through which said rods are vertically movable, lugs carried by said rods in different angular positions and adapted to engage the housings to arrest movement of the platform, and means for rotating said rods to bring one set of stopping lugs into position and permit other stops to pass through the slotted housings.

7. The combination, in elevating mechanism, of a platform, a support therefor, means for raising and lowering said platform with respect to its support, a rotatable rod depending from said platform, a slotted housing and guide through which said rod is vertically movable, lugs carried by said rod and adapted to engage the housing to arrest movement of the platform, means for rotating said rod to bring a stopping lug into position and permit another lug to pass through the slotted housing, and means for holding said rod in its adjusted position.

8. The combination, in elevating mechanism of a platform, a support therefor, means for raising and lowering the same, rotatable rods depending from said platform, slotted guide housings through which said rods are vertically movable, lugs carried by said rods and adapted to engage the housings to arrest movement of the platform, means for simultaneously rotating said rods to bring one set of stopping lugs into position and permit other lugs to pass through the slotted housings, and means for holding said rods in their adjusted positions.

9. The combination of a supporting frame including a cylinder, a plunger in said cylinder, a platform connected to said plunger, fluid pressure means for imparting vertical movement to said plunger, rotatable guide rods depending from said platform, guide housings through which said rods pass, a plurality of projecting lugs disposed in different angular positions carried by each of said rods, each set of lugs occupying the same relative position with respect to each rod, means for simultaneously turning said rods to bring their lugs into and out of position with respect to the slots of said guide housings, and means for holding said rods in adjusted positions.

In witness whereof I have signed this specification.

RICHARD W. DINZL.